(12) United States Patent
Lin et al.

(10) Patent No.: US 12,235,688 B2
(45) Date of Patent: Feb. 25, 2025

(54) MULTI-LINK HINGE ASSEMBLY

(71) Applicant: FOSITEK CORPORATION, New Taipei (TW)

(72) Inventors: Chun-Han Lin, New Taipei (TW); Yung-Chih Tseng, New Taipei (TW)

(73) Assignee: FOSITEK CORPORATION, New Taipei (TW)

( * ) Notice: Subject to any disclaimer, the term of this patent is extended or adjusted under 35 U.S.C. 154(b) by 24 days.

(21) Appl. No.: 18/334,719

(22) Filed: Jun. 14, 2023

(65) Prior Publication Data
US 2024/0329695 A1  Oct. 3, 2024

(30) Foreign Application Priority Data

Mar. 28, 2023 (TW) ................................. 112111761

(51) Int. Cl.
*G06F 1/16* (2006.01)
*F16C 11/04* (2006.01)
E05D 3/06 (2006.01)

(52) U.S. Cl.
CPC ............ *G06F 1/1681* (2013.01); *F16C 11/04* (2013.01); *E05D 3/06* (2013.01); *E05Y 2999/00* (2024.05)

(58) Field of Classification Search
CPC ............ G06F 1/1681; E05D 3/06; F16C 11/04
See application file for complete search history.

(56) References Cited

U.S. PATENT DOCUMENTS

| | | | | |
|---|---|---|---|---|
| 9,848,502 B1* | 12/2017 | Chu | ...................... | G06F 1/1681 |
| 10,401,917 B1* | 9/2019 | Dai | ...................... | G06F 1/1679 |
| 10,664,021 B1* | 5/2020 | Hsu | ...................... | H04B 1/3888 |
| 10,802,551 B1* | 10/2020 | Lin | ......................... | E05D 3/122 |
| 10,824,197 B1* | 11/2020 | Hsu | ...................... | G06F 1/1641 |
| 10,890,951 B1* | 1/2021 | Watamura | ............. | G06F 1/1681 |

(Continued)

FOREIGN PATENT DOCUMENTS

| | | | | |
|---|---|---|---|---|
| JP | 2021015522 A | * | 2/2021 | ........... G06F 1/1616 |
| TW | M634895 U | | 12/2022 | |

OTHER PUBLICATIONS

Search Report appended to an Office Action, which was issued to Taiwanese counterpart application No. 112111761 by the TIPO on Jul. 31, 2023, with an English translation thereof.

*Primary Examiner* — Chucky Y Mah
(74) *Attorney, Agent, or Firm* — Birch, Stewart, Kolasch & Birch, LLP

(57) ABSTRACT

A multi-link hinge assembly includes a link rod unit including a base rod, two supporting link rods, two synchronization link rods, two supporting rods, and a supporting plate unit. The base rod has a base rod body, two base connecting portions respectively connected to opposite ends of the base rod body, and two central connecting portions disposed between the base connecting portions. Each synchronization link rod has a first synchronization end portion pivotably connected to a respective one of the central connecting portions, and a second synchronization end portion opposite thereto. The supporting plate unit includes two supporting plates respectively connected to the supporting rods and each having inner and outer portions. The link rod unit is operable between an unfolded position and a folded position, where the second synchronization end portions are away from each other, and the inner portions define a relief space therebetween.

10 Claims, 14 Drawing Sheets

(56) References Cited

U.S. PATENT DOCUMENTS

| | | | |
|---|---|---|---|
| 10,983,569 B2* | 4/2021 | Lin | G06F 1/1616 |
| 11,016,541 B2* | 5/2021 | Lin | F16C 11/04 |
| 11,334,122 B2* | 5/2022 | Hsu | E05D 11/082 |
| 11,408,214 B1* | 8/2022 | Hsu | H04M 1/022 |
| 11,516,932 B2* | 11/2022 | Sim | E05D 3/122 |
| 11,579,661 B2* | 2/2023 | Kinoshita | G06F 1/1681 |
| 11,644,873 B2* | 5/2023 | Hsu | G06F 1/1681 |
| | | | 361/679.27 |
| 2017/0208703 A1* | 7/2017 | Lin | E05D 5/02 |
| 2017/0269637 A1* | 9/2017 | Lin | E05D 7/00 |
| 2019/0208656 A1* | 7/2019 | Myeong | H10K 50/84 |
| 2020/0375046 A1* | 11/2020 | Sim | H05K 5/0017 |
| 2020/0409429 A1* | 12/2020 | Hsu | E05D 11/06 |
| 2021/0011513 A1* | 1/2021 | Watamura | G06F 1/1652 |
| 2021/0173449 A1* | 6/2021 | Yao | G06F 1/1616 |
| 2022/0221912 A1* | 7/2022 | Hsu | H04M 1/022 |
| 2022/0283611 A1* | 9/2022 | Lin | G06F 1/1681 |
| 2022/0390989 A1* | 12/2022 | Hsu | G06F 1/1681 |
| 2022/0412138 A1* | 12/2022 | Peng | E05D 3/122 |
| 2023/0067187 A1* | 3/2023 | Lin | F16C 11/04 |
| 2023/0152849 A1* | 5/2023 | Park | G06F 1/1681 |
| | | | 361/679.01 |
| 2023/0205280 A1* | 6/2023 | Kim | G06F 1/1616 |
| | | | 361/679.27 |
| 2023/0217616 A1* | 7/2023 | Park | G06F 1/1679 |
| | | | 361/807 |
| 2023/0244274 A1* | 8/2023 | Lin | G06F 1/1616 |
| | | | 361/679.27 |
| 2023/0366248 A1* | 11/2023 | Chung | G06F 1/1681 |
| 2024/0133225 A1* | 4/2024 | Mortland | E05F 15/614 |
| 2024/0160252 A1* | 5/2024 | Hsu | G06F 1/1681 |
| 2024/0175463 A1* | 5/2024 | Hsu | F16C 11/04 |
| 2024/0251515 A1* | 7/2024 | Zhan | H04M 1/022 |

* cited by examiner

MULTI-LINK HINGE ASSEMBLY

CROSS-REFERENCE TO RELATED APPLICATION

This application claims priority to Taiwanese Invention Patent Application No. 112111761, filed on Mar. 28, 2023.

FIELD

The disclosure relates to a hinge, and more particularly to a multi-link hinge assembly.

BACKGROUND

In recent years, flexible displays are widely used in various foldable devices which may be folded between a folded position and an unfolded position. The foldable devices can be categorized into an in-folding type and an out-folding type. Generally, the in-folding type of a foldable device includes a flexible display, two shell halves, and a hinge interconnecting the shell halves. The flexible display lays flat on the shell haves when the foldable device is in the unfolded position, and is sandwiched between the shell halves when the foldable device is in the folded position. In order to prevent a folded portion of the flexible display from being damaged due to insufficient spaces between the shell halves when the foldable device is in the folded position, a relatively large hinge is used to provide an extra space between the shell halves, so the folded portion of the flexible display may be accommodated in the extra space. However, when the foldable device is in the folded position, such design may increase a gap between the shell halves and an overall size of the foldable device, which may adversely affect efforts of minimizing the foldable device and is a problem to be resolved.

SUMMARY

Therefore, an object of the disclosure is to provide a multi-link hinge assembly that can alleviate at least one of the drawbacks of the prior art.

According to the disclosure, a multi-link hinge assembly includes at least one link rod unit and a supporting plate unit. The at least one link rod unit includes a base rod, two supporting link rods, two synchronization link rods, two first supporting rods. The base rod has a base rod body, two base connecting portions that are respectively connected to opposite ends of the base rod body, and two central connecting portions that are disposed on the base rod body and between the base connecting portions. Each of the supporting link rods has a first linking portion that is pivotably connected to a respective one of the base connecting portions, and a second linking portion that is opposite to the first linking portion. Each of the synchronization link rods has a first synchronization end portion that is pivotably connected to a respective one of the central connecting portions, and a second synchronization end portion that is opposite to the first synchronization end portion. The first synchronization end portions of the synchronization link rods mesh with each other so the synchronization link rods are synchronously pivotable relative to the base rod body. Each of the first supporting rods includes a first connecting portion that is pivotably connected to the second linking portion of a respective one of the supporting link rods and the second synchronization end portion of a respective one of the synchronization link rods. The supporting plate unit includes two first supporting plates respectively connected to the first supporting rods. Each of the first supporting plates has opposite inner and outer portions. The link rod unit is operable between an unfolded position, where the second synchronization end portions of the synchronization link rods are proximate to each other and where the first supporting plates are flush with each other with the inner portions of the first supporting plates being adjacent to each other, and a folded position, where the second synchronization end portions of the synchronization link rods are away from each other, where the first supporting plates face each other, and where a distance between the inner portions of the first supporting plates is greater than that between the outer portions of the first supporting plates such that the inner portions of the first supporting plates define a relief space therebetween.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
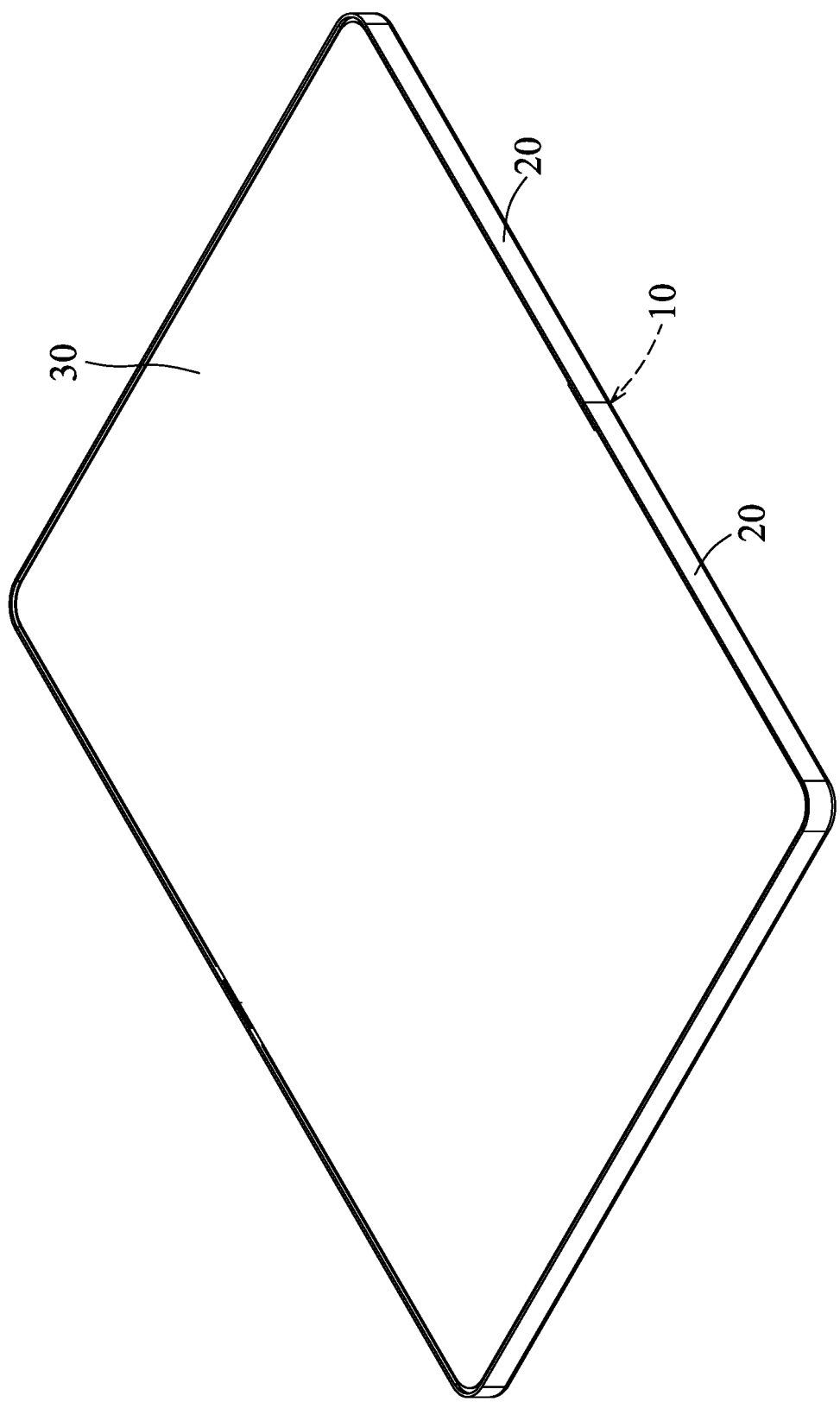
FIG. 1 is a perspective view of two shell halves on which a flexible display is disposed, illustrating a multi-link hinge assembly of a first embodiment according to the present disclosure being adapted for interconnecting the shell halves, and being in an unfolded position.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
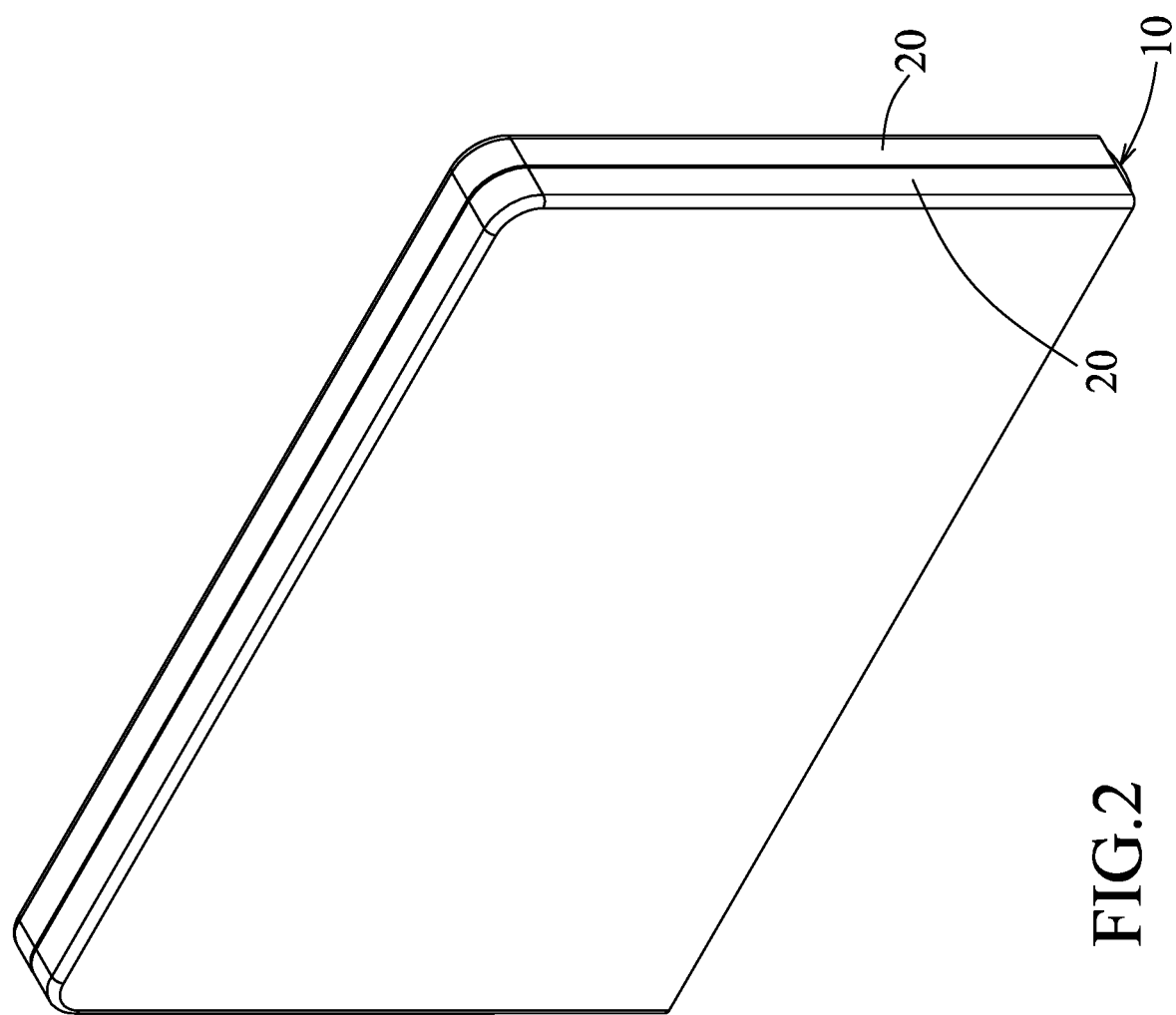
FIG. 2 is a perspective view of the shell halves and the first embodiment in a folded position.
Figure 3:
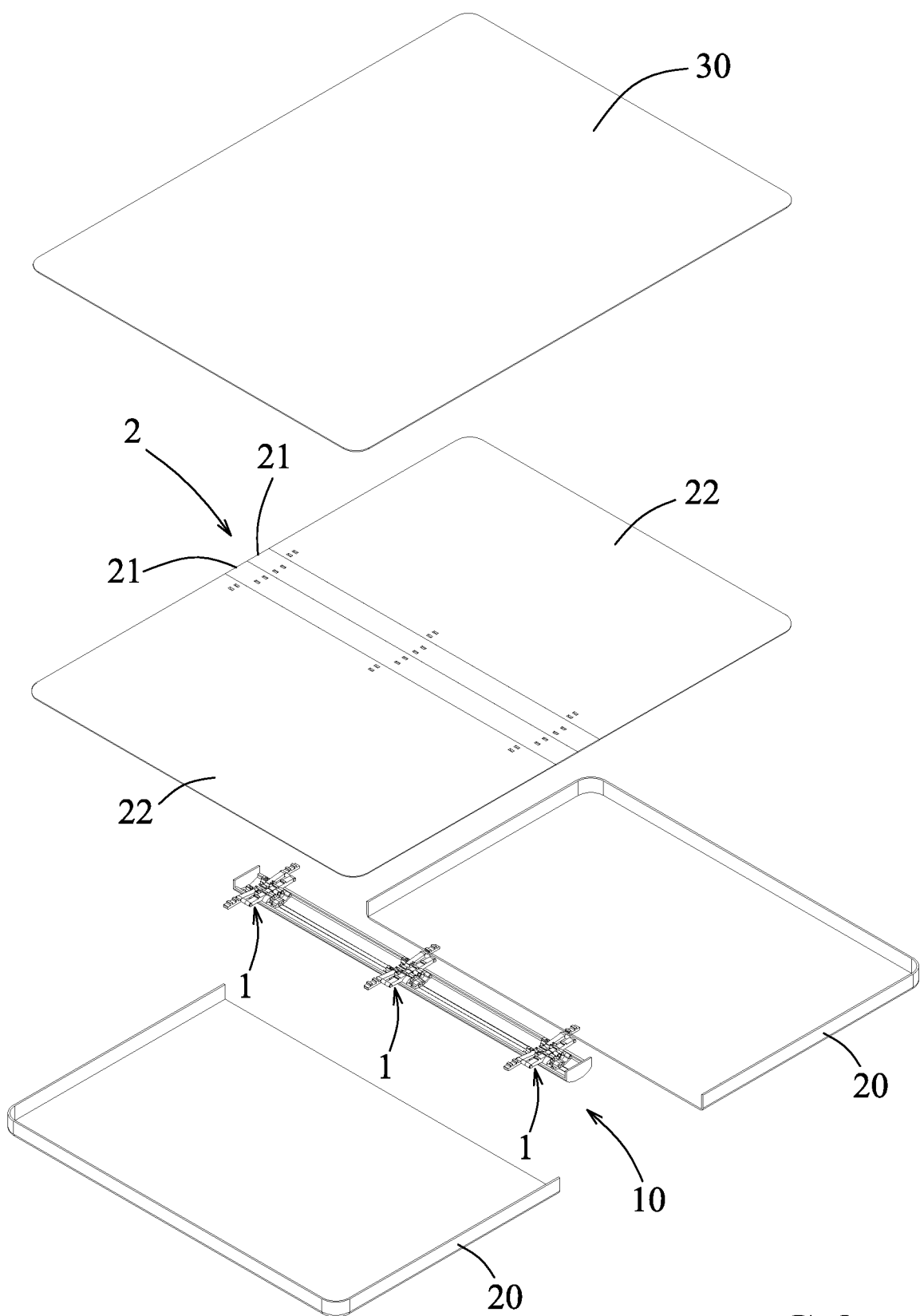
FIG. 3 is a partly exploded perspective view of FIG. 1.

Referring to FIGS. 1 to 3, a multi-link hinge assembly 10 of a first embodiment according to the present disclosure is adapted to be mounted between two shell halves 20 that are provided for mounting of a flexible display 30 thereon so as to form a foldable electronic device, which is an in-fold type of a foldable device. The shell halves 20 are movable between an opened state and a closed state. When the shell halves 20 are in the opened state, the shell halves 20 are unfolded and are disposed side-by-side to each other so as to form a flat surface, and when the shell halves are in the closed state, the shell halves 20 are folded to face each other. In this embodiment, the multi-link hinge assembly 10 of the present disclosure includes three link rod units 1 and a supporting plate unit 2.

Figure 4:
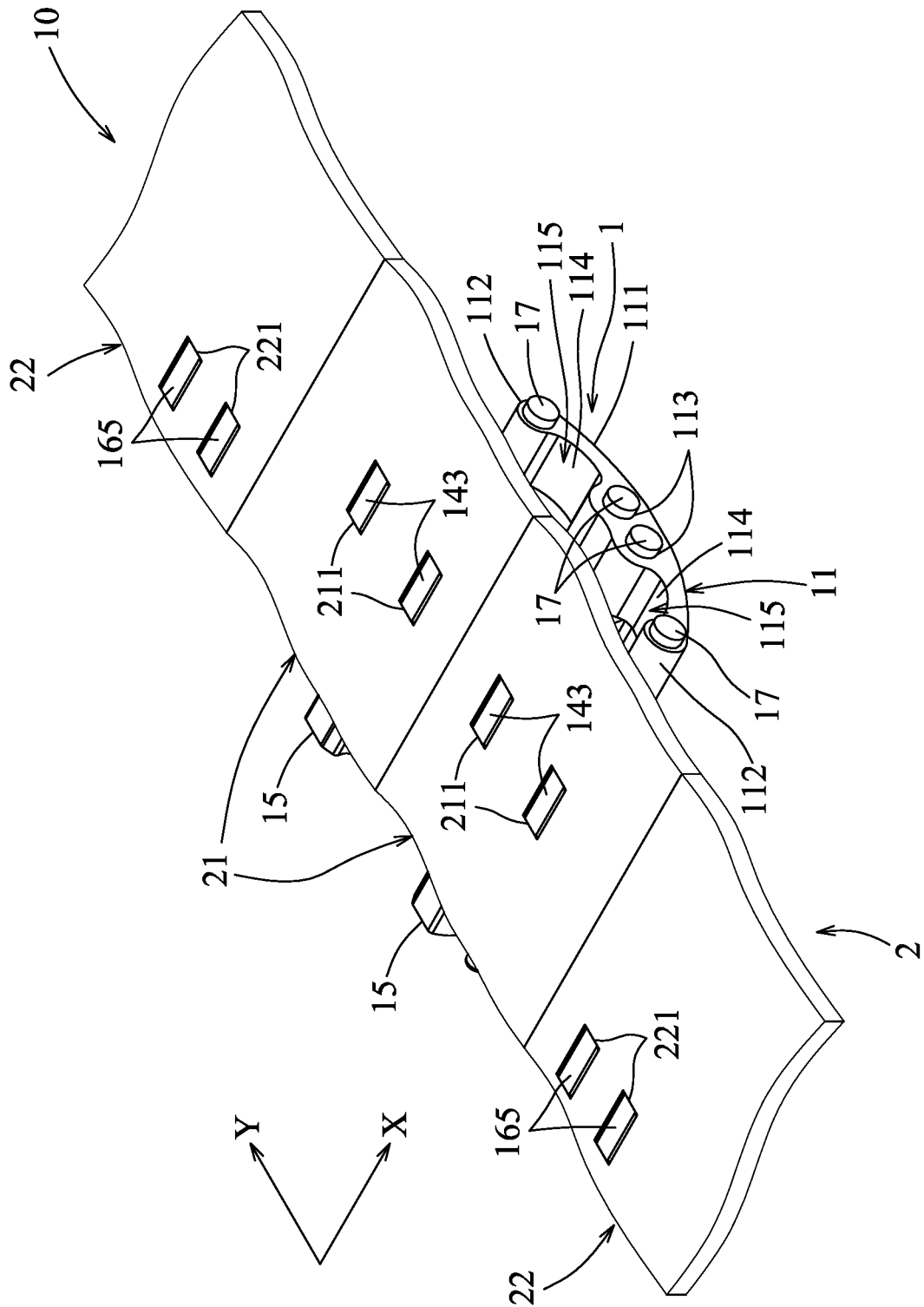
FIG. 4 is a fragmentary perspective view of the first embodiment.
Figure 5:
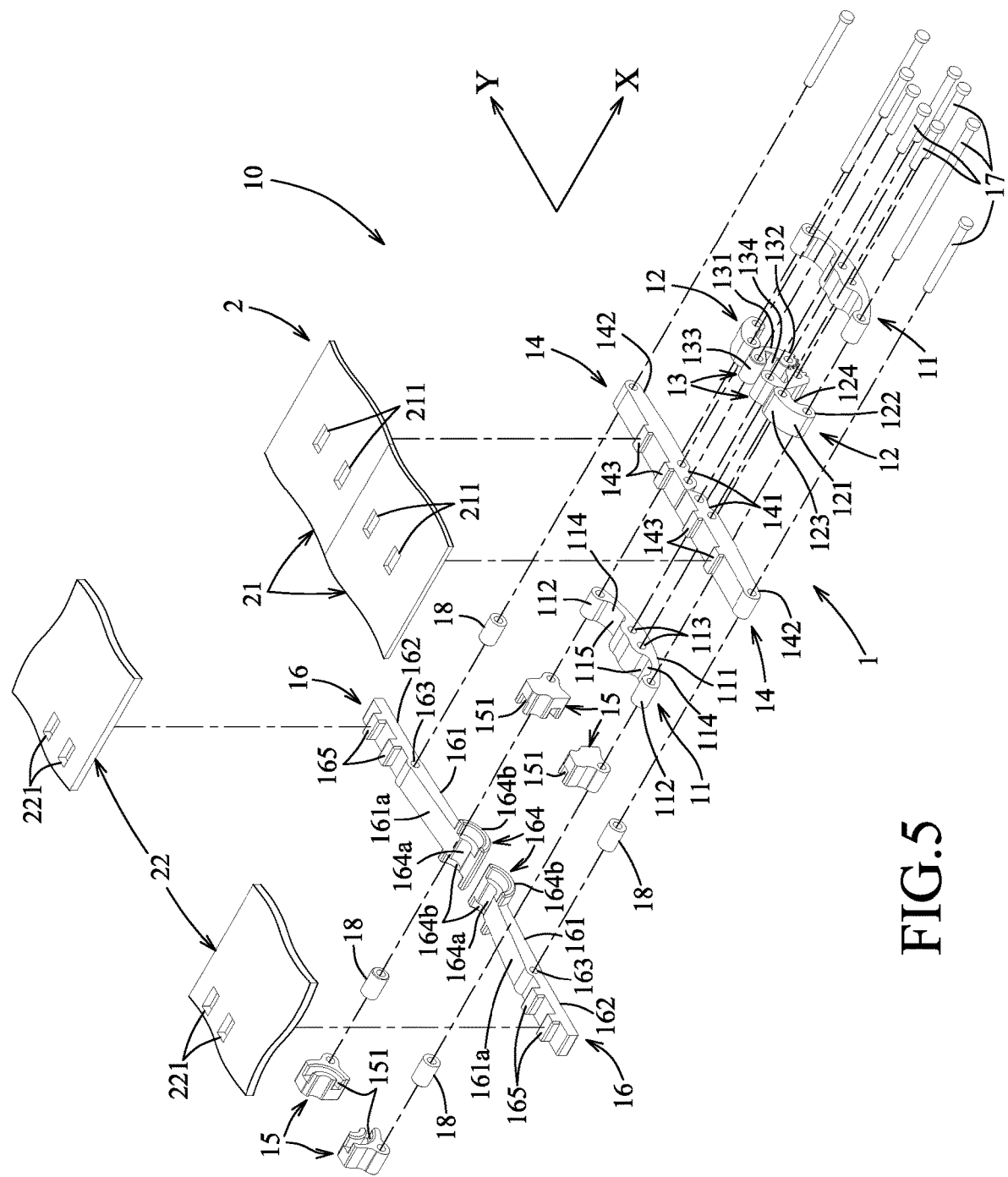
FIG. 5 is a fragmentary exploded perspective view of the first embodiment.
Figure 6:
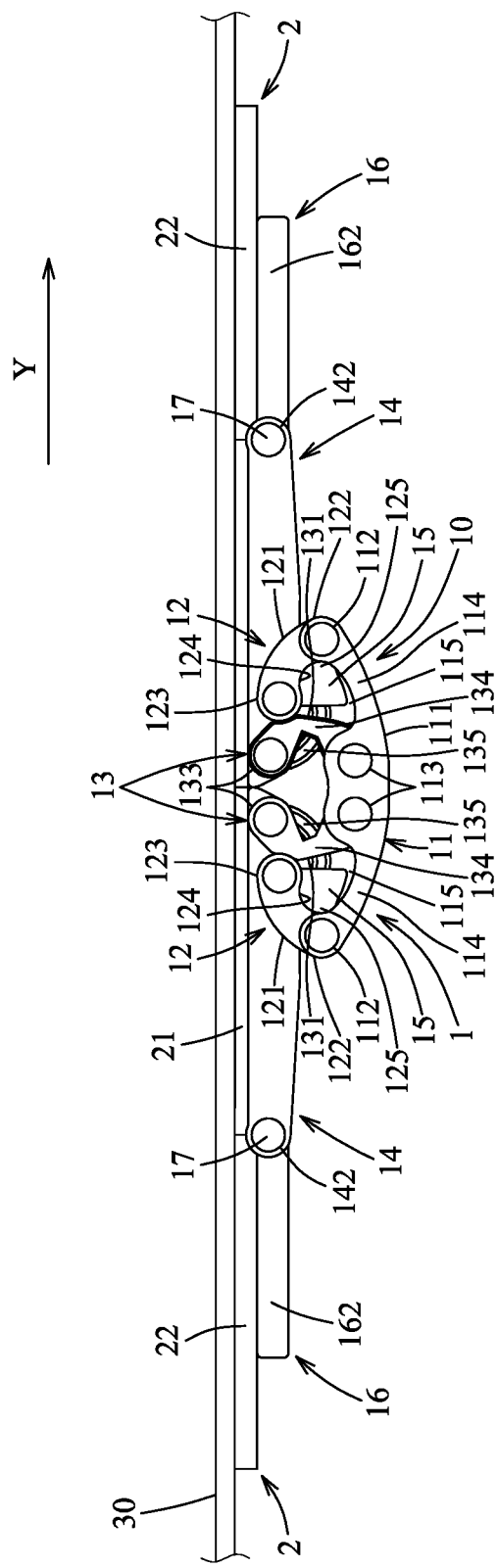
FIG. 6 is a fragmentary front view of the first embodiment, illustrating a link rod unit of the first embodiment being in the unfolded position.
Figure 7:
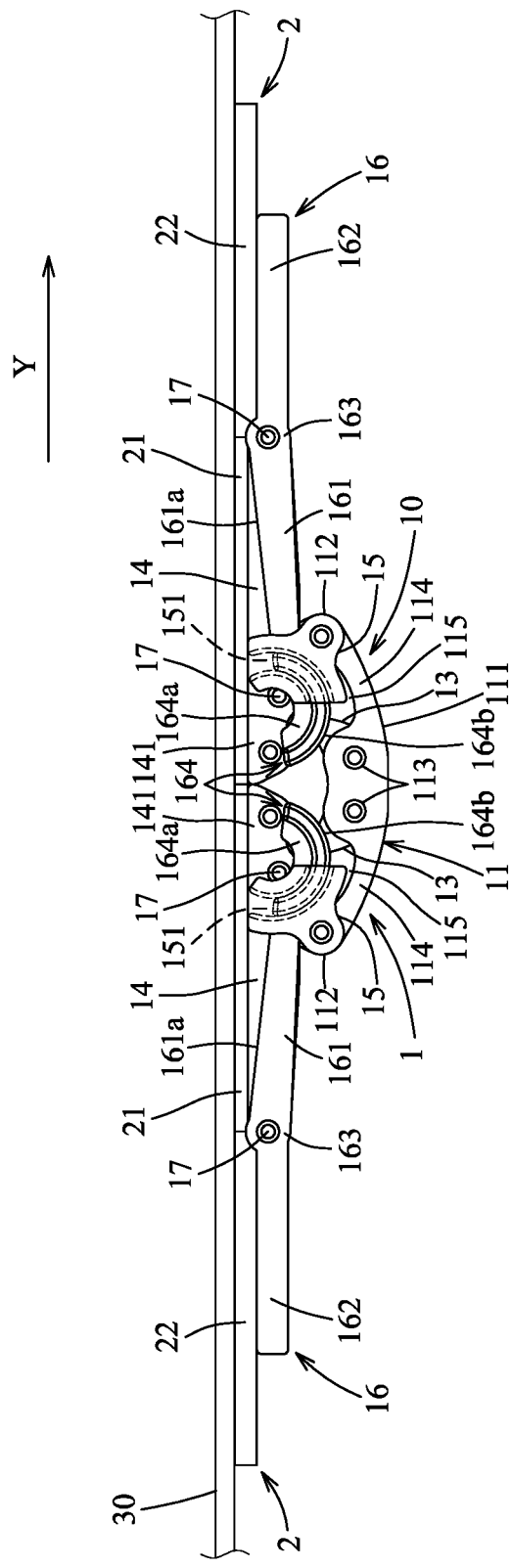
FIG. 7 is a fragmentary rear view of the first embodiment, illustrating the link rod unit being in the unfolded position.

It should be noted that since structure of each of the link rod units 1 is identical, only one of the link rod units 1 will be described in the following description for the sake of brevity. Referring to FIGS. 4 to 6, the link rod unit 1 includes two base rods 11, two supporting link rods 12, two synchronization link rods 13, two first supporting rods 14, two pairs of rotatable seats 15, two second supporting rods 16, ten pins 17, and four sleeves 18.

The base rods 11 are spaced apart from each other in a first direction (X). Each of the base rods 11 includes a base rod body 111, two base connecting portions 112 that are respectively connected to opposite ends of the base rod body 111 and that are opposite in a second direction (Y) transverse to the first direction (X), two central connecting portions 113 that are disposed on the rod body 111 and between the base connecting portions 112, two furrow portions 114 that are formed in a top side of the base rod body 111, and two base grooves 115 that are defined respectively by the furrow portions 114. For each of the base rods 11, each of the furrow portions 114 is located between one of the central connecting portions 113 and one of the base connecting portions 112 that is adjacent to the one of the central connecting portions 113. As shown in FIG. 6, each of the base rods 11 is substantially arcuate and is symmetric along a line extending in the first direction (X), and the base connecting portions 112 of each of the base rods 11 are respectively connected to left and right sides of the base rod body 111 and protrude upwardly to be higher than the central connecting portions 113.

The supporting link rods 12 are pivotably connected to both of the base rods 11 by two of the pins 17. Each of the supporting link rods 12 has a first linking portion 122 that is pivotably connected to a respective one of the base connecting portions 112 of each of the base rods 11, a second linking portion 123 that is opposite to the first linking portion 122, a supporting link rod body 121 that interconnects the first linking portion 122 and the second linking portion 123, a supporting recessed portion 124 that is formed in the supporting link rod body 121, and a supporting accommodating space 125 that is defined by the supporting recessed portion 124. The synchronization link rods 13 are pivotably connected to the central connecting portions 113 of each of the base rods 11 by two of the pins 17. Specifically, each of the synchronization link rods 13 has a first synchronization end portion 132 that is pivotably connected to a respective one of the central connecting portions 113 of each of the base rods 11, a second synchronization end portion 133 that is opposite to the first synchronization end portion 132, a synchronization rod body 131 that interconnects the first synchronization end portion 132 and the second synchronization end portion 133, a synchronization recessed portion 134 that is formed in the synchronization rod body 131, and a synchronization concave space 135 that is defined by the synchronization recessed portion 134. The first synchronization end portions 132 of the synchronization link rods 13 mesh with each other so the synchronization link rods 13 are synchronously pivotable relative to the base rod body 111 of each of the base rods 11. In this embodiment, each of the first synchronization end portions 132 has a plurality of teeth that are formed on an outer surface thereof and that engage the teeth of the other one of the first synchronization end portions 132. As shown in FIG. 5, the supporting link rods 12 and the synchronization link rods 13 are disposed between the base rods 11 along the line extending in the first direction (X), and are pivotable relative to the base rods 11. Furthermore, the synchronization link rods 13 are disposed between the supporting link rods 12. As depicted in FIG. 6, the supporting recessed portions 124 of the supporting link rods 12 respectively face the furrow portions 114, and the synchronization concave portions 134 of the synchronization link rods 13 face each other.

By virtue of four of the pins 17, the first supporting rods 14 are pivotably and respectively connected to the second pivot end portions 123 of the supporting link rods 12, and are pivotably and respectively connected to the second synchronization end portions 133 of the synchronization link rods 13. Furthermore, the first supporting rods 14 are disposed on one of the base rods 11 and between the supporting link rods 12 and the second supporting rods 16 in the first direction (X). Each of the first supporting rods 14 includes a first connecting end portion 141 that is pivotably connected to the respective one of the second synchronization end portions 123 and the respective one of the second synchronization end portions 133, a second connecting end portion 142 that is opposite to the first connecting end portion 141, and two protrusions 143 that are disposed substantially between the second connecting end portion 142 and the first connecting end portion 141 and that protrude upwardly. For each of the first supporting rods 14, a pivot point between the first connecting end portion 141 and the respective one of the second synchronization end portions 133 is closer to a distal end of the first connecting end portion 141 than a pivot point between the first connecting end portion 141 and the respective one of the second synchronization end portions 123. Furthermore, the first supporting rods 14 are co-movable with the second pivot end portions 123 and the second synchronization end portions 133.

The rotatable seats 15 of each pair are mounted respectively to the second supporting rods 16. In this embodiment, the rotatable seats 15 of each pair are pivotably connected to the base connecting portions 112 of each of the base rods 11 and the first linking portions 122 of the supporting link rods 12 by the two of the pins 17 which extend respectively through the first linking portions 122 of the supporting link rods 12 and respectively through the base connecting portions 112 of each of the base rods 11. In this way, the rotatable seats 15 of each pair and the first linking portions 122 of the supporting link rods 12 are pivotable relative to the base rods 11. One of the rotatable seats 15 of one pair is spaced apart from one of the rotatable seats 15 of the other one pair in the first direction (X) by one of the sleeves 18 that is disposed therebetween. Each of the rotatable seats 15 is formed with an arcuate receiving groove 151 that faces the arcuate receiving groove 151 of one of the rotatable seats 15 of the other pair.

By virtue of two of the pins 17, the second supporting rods 16 are respectively and pivotably connected to the second connecting end portions 142 of the first supporting rods 14. Each of the first supporting rods 14 is spaced apart from a respective one of the second supporting rods 16 by one of the sleeves 18 in the first direction (X). Each of the second supporting rods 16 includes a supporting rod body 161, a supporting end portion 162, a supporting connection portion 163, a rotary end portion 164, and two projections 165. For each of the second supporting rods 16, the rotary end portion 164 is opposite to the supporting end portion 162, the supporting connection portion 163 is disposed between the supporting end portion 162 and the rotary end portion 164, and is pivotably connected to the second connecting end portion 142 of the respective one of the first supporting rods 14, and the supporting rod body 161 interconnects the supporting connection portion 163 and the rotary end portion 164 and has an inclined surface 161a such that a thickness of the supporting rod body 161 decreases from the supporting connection portion 163 toward the rotary end portion 164. For each of the second supporting rods 16, the rotary end portion 164 includes a connecting block 164a that extends from the supporting rod body 161, and two arcuate flanges 164b that extend transversely from the connecting block 164a away from each other and extend respectively into corresponding two of the arcuate receiving grooves 151 of each pair of the rotatable seats 15 which faces each other. In this embodiment, the connecting block 164a is an arcuate block, and may be configured as other shapes in other embodiments of the present disclosure.

The supporting plate unit 2 includes two first supporting plates 21 respectively connected to the first supporting rods 14, and two second supporting plates 22 respectively connected to the supporting end portions 162 of the second supporting rods 16 and respectively abutting against the second connecting end portions 142. Each of the first supporting plates 21 has two spaced-apart engaging holes 211 corresponding respectively in position to and respectively engaging the protrusions 143 of the respective one of the first supporting rods 14, so the first supporting plates 21 are respectively connected to the first supporting rods 14. Each of the second supporting plates 22 has two spaced-apart connecting holes 221 corresponding respectively in position to and respectively engaging the projections 165 of the respective one of the second supporting rods 16 so the second supporting plates 22 are respectively connected to the second supporting rods 16. It should be noted that, in this embodiment, the flexible display 30 is mounted fixedly on the second supporting plates 22, but the present disclosure is not limited to this example. In other embodiments, the flexible display 30 may be fixedly mounted on the shell halves 20.

Referring to FIGS. 5 to 9, by virtue of the synchronization link rods 13, the link rod unit 1 is operable between an unfolded position (see FIGS. 6 and 7) and a folded position (see FIGS. 8 and 9) such that the shell halves 20 (see FIG. 3) are moved synchronously and symmetrically along the line extending in the first direction (X). Each of the first supporting plates 21 has opposite inner and outer portions. As shown in FIG. 6, when the link rod unit 1 is in the unfolded position, the second synchronization end portions 133 are proximate to each other and serve as two supporting ends that respectively support the first supporting plates 21 thereon, and the first supporting plates 21 are flush with each other with the inner portions of the first supporting plates 21 being adjacent to each other. In this position, the first connecting end portions 141 of the first supporting rods 14 are adjacent to each other, and the first supporting rod 14 are arranged to extend in the second direction (Y) to support the first supporting plates 21 thereon. Similarly, the rotary end portions 164 of the second supporting rods 16 are adjacent to each other, and the second connecting rods 16 are arranged to extend in the second direction (Y) to support the second supporting plates 22 and thus the flexible display 30.

Figure 8:
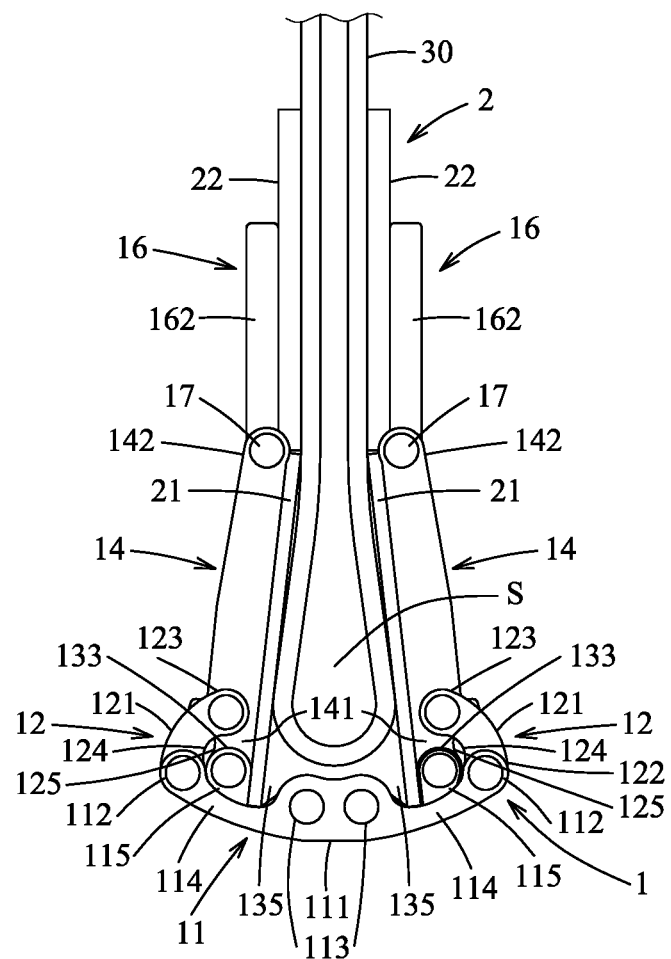
FIG. 8 is a fragmentary front view of the first embodiment, illustrating the link rod unit being in the folded position.
Figure 9:
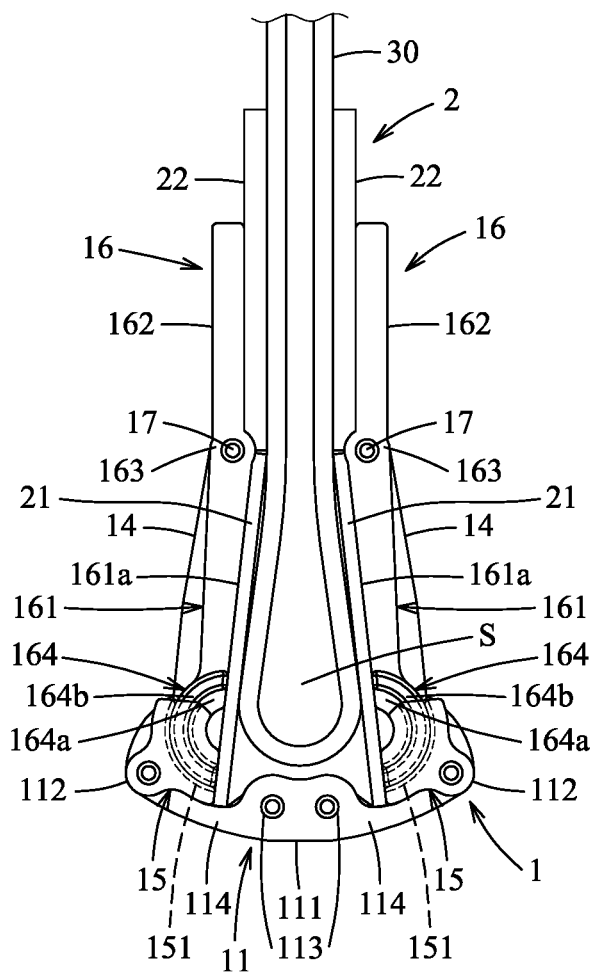
FIG. 9 is a fragmentary rear view of the first embodiment, illustrating the link rod unit being in the folded position.

To move the link rod unit 1 from the unfolded position to the folded position, the link rod unit 1 is operated such that the second synchronization end portions 133 are moved away from each other, and that the second linking portions 123 of the supporting link rods 12 are moved away from each other, so the second synchronization end portions 133 are respectively received in the supporting accommodating spaces 125 defined respectively by the supporting recessed portions 124 of the supporting link rods 12. It should be noted that, during movement of the link rod unit 1 from the unfolded position to the folded position, the second linking portions 123 first move toward each other and then slightly move away from each other. In the meantime, the first connecting end portions 141 of the first supporting rods 14 move away from each other, the rotary end portions 164 of the second supporting rods 16 move away from each other, and the arcuate flanges 164b of each of the second supporting rods 16 are rotated upwardly in the corresponding two of the arcuate receiving grooves 151 of each pair of the rotatable seats 15 which faces each other. In this way, the inner portions of the first supporting plates 21 are respectively received in the synchronization concave spaces 135 defined respectively by the synchronization recessed portions 134 of the synchronization link rods 13 and the base grooves 115 defined respectively by the furrow portions 114 of each of the base rods 11. When the link rod unit 1 is moved to the folded position, since a distance between the supporting connection portions 163 of the second supporting rods 16 is smaller than that between the rotary end portions 164 of the second supporting rods 16, the first supporting plates 21 respectively abut against the inclined surfaces 161a of the supporting rod bodies 161 of the second supporting rods 16, the second connecting end portions 142 of the first supporting rods 14 are proximate to and face each other, and the first connecting end portions 141 of the first supporting rods 14 are away from each other. As a result, a relief space (S) that is adapted to accommodate a bend portion of the flexible display 30 is formed between the inner portions of the first supporting plates 21. In this embodiment, a profile of the bend portion of the flexible display 30 is droplet shaped. As shown in FIG. 8, since a distance between the inner portions of the first supporting plates 21 is greater than that between the outer portions of the first supporting plates 21 when the link rod unit 1 is in the folded position, an overall thickness of the multi-link hinge assembly 10 is relatively small.

When the link rod unit 1 is operated to move to the unfolded position, the second synchronization end portions 133 of the synchronization link rods 13 are disposed outside of the supporting accommodating spaces 125 defined by the supporting recessed portions 124 of the supporting link rods 12 and serve as the supporting ends that respectively support the first supporting plates 21 thereon as previously described.

It should be noted that, in this embodiment, the number of the base rods 11 of each of the link rod units 1 is two, and the number of the rotatable seats 15 is four, i.e., two pairs, and each of the rotary end portions 164 includes a connecting block 164a and two arcuate flanges 164b extending away from each other from the connecting block 164a, but the present disclosure is not limited to the specific number of these elements. For example, in other embodiments, the number of the base rod 11 may be only one. In a case where the link rod unit 1 includes only two of the rotatable seats 15, the rotary end portion 164 of each of the second supporting rods 16 may include only one arcuate flange 164b that extends transversely from the connecting block 164a into the receiving groove 151 of the respective one of the connecting seats 15. The configuration described herein is to provide a relatively compact dimension of the multi-link hinge assembly 10 when the link rod unit 1 is in the folded position, and to prevent relative movement between the rotary end portions 164 of the second supporting rods 16 in the second direction (Y) during pivot movement of the link rod unit 1 between the folded position and the unfolded position.

Figure 10:
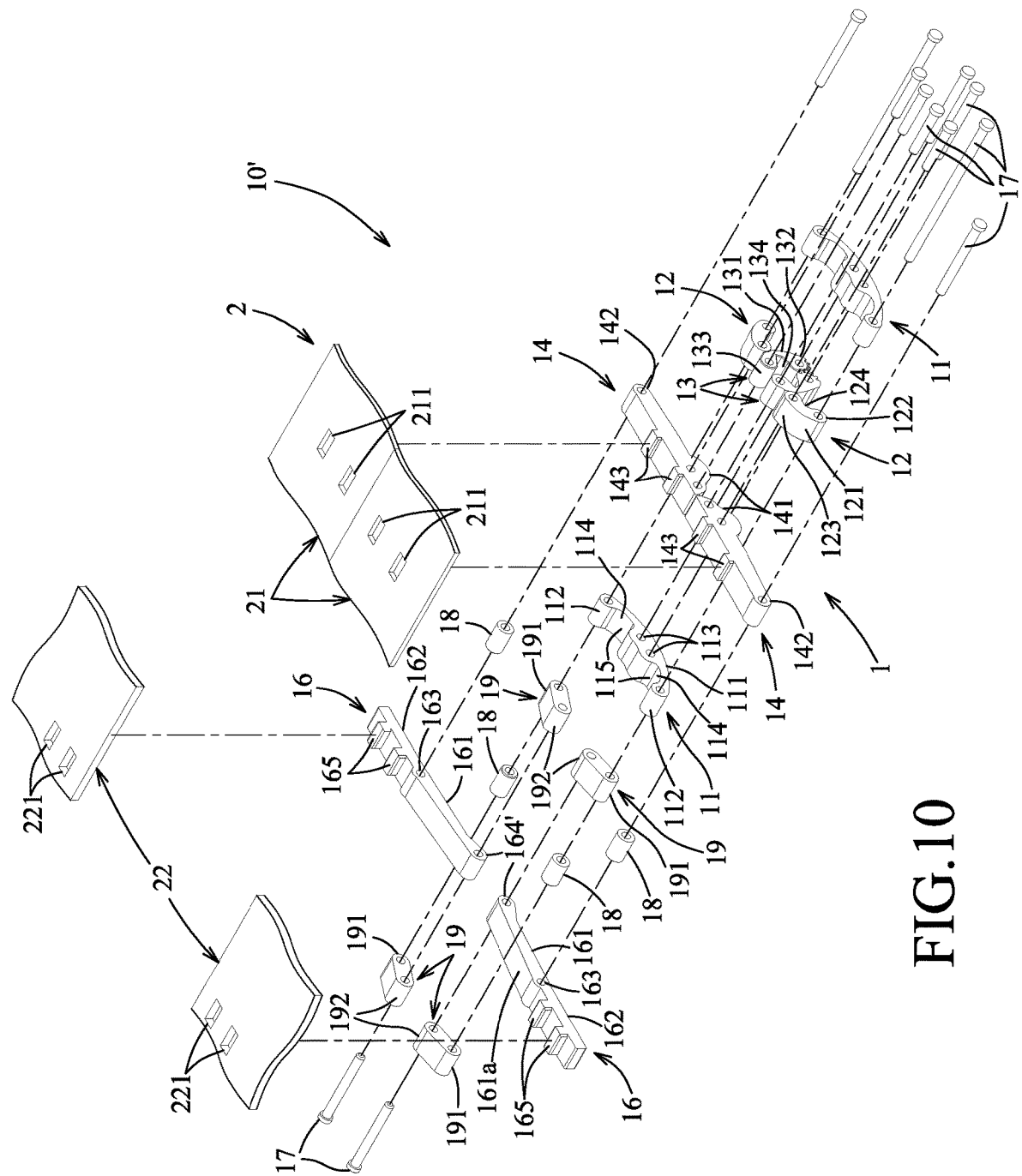
FIG. 10 is a fragmentary exploded perspective view of the multi-link hinge assembly of a second embodiment according to the present disclosure.
Figure 11:
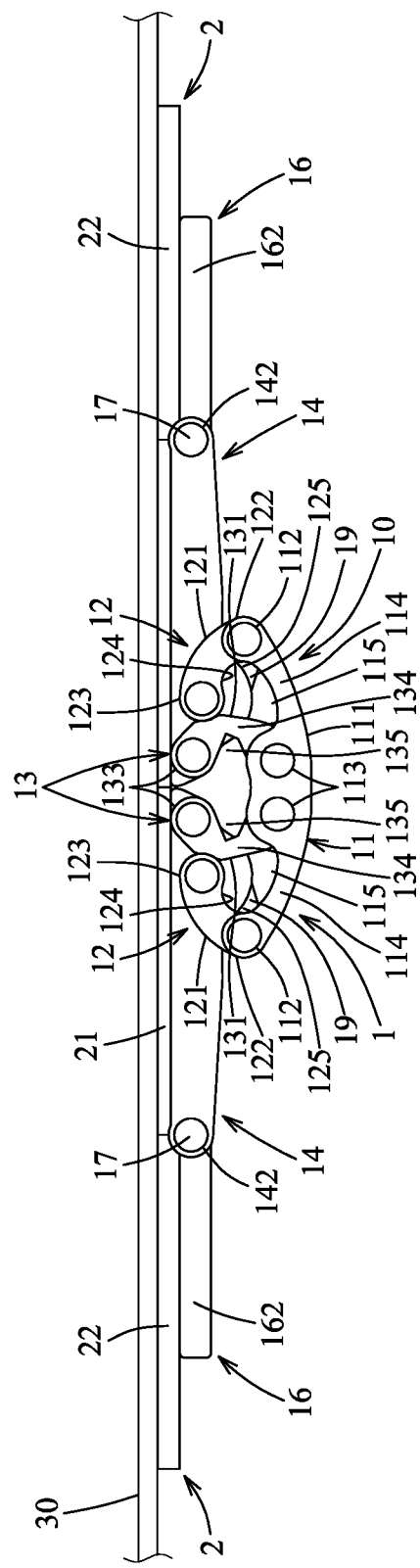
FIG. 11 is a fragmentary front view of the second embodiment, illustrating the link rod unit of the second embodiment being in the unfolded position.
Figure 12:
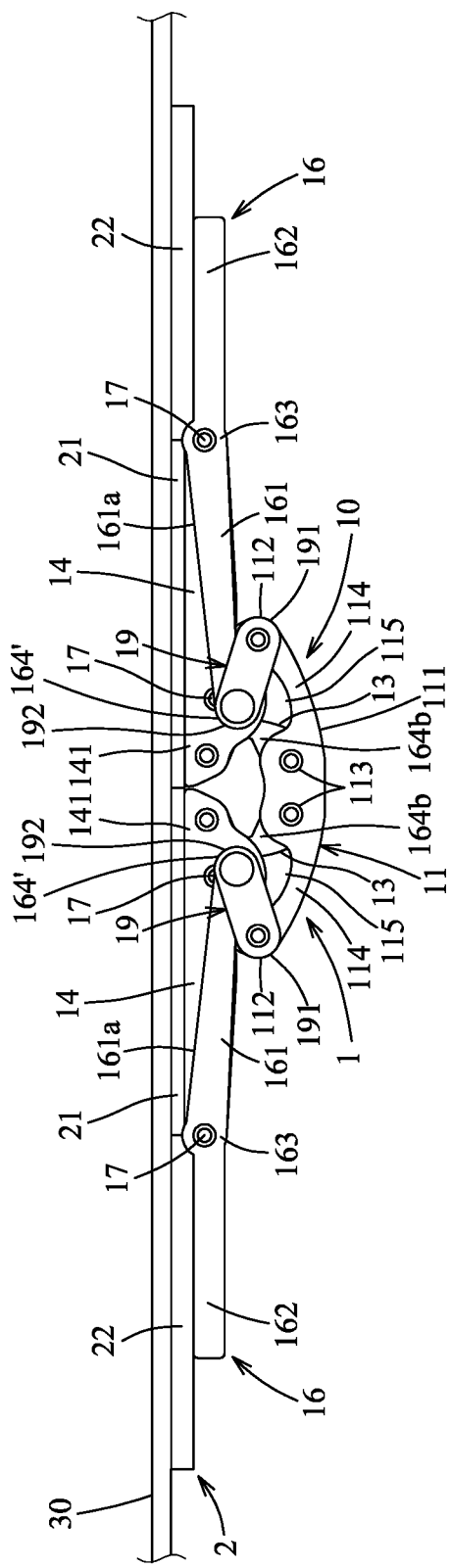
FIG. 12 is a fragmentary rear view of the second embodiment, illustrating the link rod unit of the second embodiment being in the unfolded position.
Figure 13:
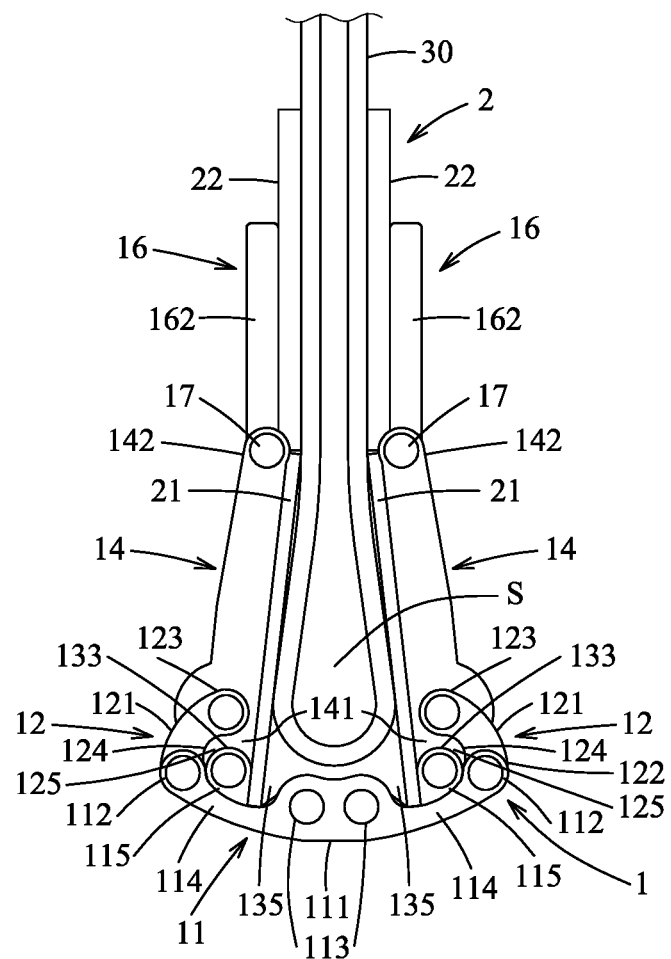
FIG. 13 is a fragmentary front view of the second embodiment, illustrating the link rod unit of the second embodiment being in the folded position.
Figure 14:
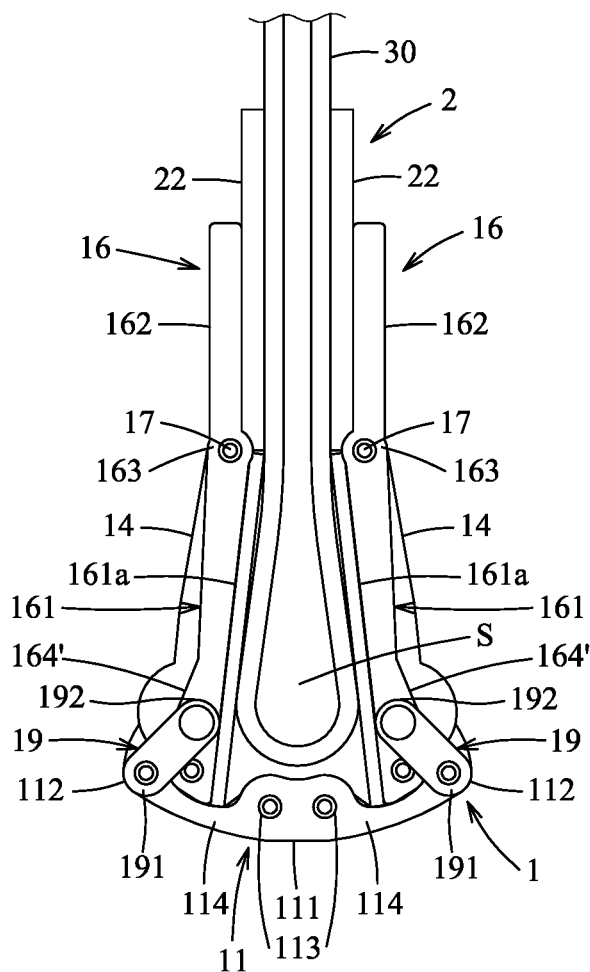
FIG. 14 is a fragmentary rear view of the second embodiment, illustrating the link rod unit of the second embodiment being in the folded position.

Referring to FIG. 10, a second embodiment of the multi-link hinge assembly 10' of the present disclosure is similar to the first embodiment, and the differences between the first embodiment and the second embodiment reside in the following. In the second embodiment, the rotatable seats 15 depicted in FIG. 5 are replaced by two pairs of connecting linkages 19. The connecting linkages 19 of each pair are mounted respectively to the second supporting rods 16. Each of the connecting linkages 19 of each pair includes a first linkage portion 191 that is connected to a respective one of the base connecting portions 112 of each of the base rods 11, and a second linkage portion 192 that is opposite to the first linkage portions 191 and that is connected to the first linking portion 122 of the respective one of the supporting link rods 12. It should be noted that the number of the pins 17 in the second embodiment is twelve. Furthermore, the configuration of the connecting block 164a and the arcuate flanges 164b of the rotary end portion 164 of each of the second supporting rods 16 depicted in FIG. 5 is omitted in this embodiment. In the second embodiment, for each of the second supporting rods 16, the rotary end portion 164' is formed with a through hole, and one of the pins 17 extends through the through hole of the rotary end portion 164', the second linkage portion 192 of one of the connecting linkages 19 of each pair of the connecting linkages 19, and one of the central connecting portions 113 of the base rod body 111 of each of the base rods 11. In this way, the rotary end portion 164' of each of the second supporting rods 16 is pivotable relative to the second linkage portions 192 of two pairs of the connecting linkages 19 that are arranged in the first direction (X).

Referring to FIGS. 10 to 14, by virtue of the synchronization link rods 13, the link rod unit 1 is also operable between the unfolded position (see FIGS. 11 and 12) and the folded position (see FIGS. 13 and 14) such that the shell halves 20 (see FIGS. 1 to 3) are moved synchronously and symmetrically along the line extending in the first direction (X). When the link rod unit 1 is in the unfolded position, the second synchronization end portions 133 are proximate to each other and serve as the supporting ends that respectively support the first supporting plates 21 thereon, and the first supporting plates 21 are flush with each other to thereby support the flexible display 30. When it is desired to fold the shell halves 20, the link rod unit 1 is operated to pivot from the unfolded position to the folded position. During pivot movement of the link rod unit 1, the second synchronization end portions 133 of the synchronization link rods 13 move away from each other, and the second linking portion 123 of the supporting link rods 12 move away from each other, such that the second synchronization end portions 133 are respectively received in the supporting accommodating spaces 125 defined respectively by the supporting recessed portions 124 of the supporting link rods 12. During the above movements, the first connecting end portions 141 of the first supporting rods 14 move away from each other, the rotary end portions 164' of the second supporting rods 16 move away from each other, the first supporting plates 21 pivot toward each other, and the second supporting plates 22 pivot toward each other. In this way, the rotary end portion 164' of each of the second supporting rods 16 pivots relative to the second linkage portions 192 of two pairs of the connecting linkages 19, and slightly pulls the second linkage portions 192 to pivot away from each other. It should be noted that, during movement of the link rod unit 1 from the unfolded position to the folded position, the second linkage portions 192 of each pair first move toward each other and then slightly move away from each other. When the link rod unit 1 is in the folded position, the first supporting plates 21 respectively abut against the inclined surfaces 161a of the supporting rod bodies 161 of the second supporting rods 16, the second connecting end portions 142 of the first supporting rods 14 are proximate to and face each other, and the first connecting end portions 141 of the first supporting rods 14 are away from each other. Similar to the first embodiment, the relief space (S) that is adapted to accommodate a bend portion of the flexible display 30 which is droplet shaped is also formed between the inner portions of the first supporting plates 21.

In summary, in the multi-link hinge assembly 10 and 10' of the present disclosure, by virtue of the link rod unit 1, when the link rod unit 1 is in the folded position, the second synchronization end portions 133 are distal from each other, and the distance between the inner portions of the first supporting plates 21 is greater than that between the outer portions of the first supporting plates 21, such that the relief space (S) that is adapted to accommodate a bend portion of the flexible display 30 is formed to prevent the flexible display 30 from being pressed and damaged. Furthermore, such configuration makes the overall size of the multi-link hinge assembly 10 and 10' relatively compact when the link rod unit 1 is in the folded position, so the object of the present disclosure is indeed achieved.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A multi-link hinge assembly comprising:
   at least one link rod unit that includes
      a base rod having
         a base rod body,
         two base connecting portions that are respectively connected to opposite ends of said base rod body, and
         two central connecting portions that are disposed on said base rod body and between said base connecting portions,
      two supporting link rods, each of said supporting link rods having
         a first linking portion that is pivotably connected to a respective one of said base connecting portions, and
         a second linking portion that is opposite to said first linking portions,
      two synchronization link rods, each of said synchronization link rods having
         a first synchronization end portion that is pivotably connected to a respective one of said central connecting portions, and
         a second synchronization end portion that is opposite to said first synchronization end portion, said first synchronization end portions of said synchronization link rods meshing with each other so said synchronization link rods are synchronously pivotable relative to said base rod body, and
      two first supporting rods, each of said first supporting rods including a first connecting portion that is pivotably connected to said second linking portion of a respective one of said supporting link rods and said second synchronization end portion of a respective one of said synchronization link rods; and
   a supporting plate unit that includes two first supporting plates respectively connected to said first supporting rods, each of said first supporting plates having opposite inner and outer portions;
   wherein said link rod unit is operable between an unfolded position, where said second synchronization end portions of said synchronization link rods are proximate to each other and where said first supporting plates are flush with each other with said inner portions of said first supporting plates being adjacent to each other, and a folded position, where said second synchronization end portions of said synchronization link rods are away from each other, where said first supporting plates face each other, and where a distance between said inner portions of said first supporting plates is greater than that between said outer portions of said first supporting plates such that said inner portions of said first supporting plates define a relief space therebetween.

2. The multi-link hinge assembly as claimed in claim 1, wherein:
   each of said first supporting rods further includes a second connecting end portion opposite to said first connecting end portion;
   said at least one link rod unit further includes
      two connecting seats respectively and pivotably connected to said first linking portions of said supporting link rods, and
      two second supporting rods respectively and rotatably connected to said connecting seats, and respectively and pivotably connected to said second connecting end portions of said first supporting rods; and
   said supporting plate unit further includes two second supporting plates respectively connected to said second supporting rods, and respectively abutting against said second connecting end portions of said first supporting rods.

3. The multi-link hinge assembly as claimed in claim 2, wherein:
   each of said second supporting rods includes
      a supporting end portion connected to the respective one of said second supporting plates,
      a rotary end portion opposite to said supporting end portion, and
      a supporting connection portion disposed between said supporting end portion and said rotary end portion, and pivotably connected to said second connecting end portion of the respective one of said first supporting rods; and
   each of said connecting seats has an arcuate receiving groove, said rotary end portion of each of said second supporting rods being rotatably received in said arcuate receiving groove of the respective one of said connecting seats.

4. The multi-link hinge assembly as claimed in claim 3, wherein:
   each of the second supporting rods further includes a supporting rod body interconnecting said supporting connection portion and said rotary end portion, and having an inclined surface; and
   when said link rod unit is in the folded position, a distance between said supporting connection portions of said second supporting rods is smaller than that between said rotary end portions of said second supporting rods, and said first supporting plates respectively abut against said inclined surfaces of said supporting rod bodies of said second supporting rods.

5. The multi-link hinge assembly as claimed in claim 4, wherein for each of said second supporting rods, said rotary end portion includes:
   a connecting block extending from said supporting rod body; and
   an arcuate flange extending transversely from said connecting block into said arcuate receiving groove of the respective one of said connecting seats.

6. The multi-link hinge assembly as claimed in claim 1, wherein:
   each of said supporting link rods further has
      a supporting link rod body interconnecting said first linking portion and said second linking portion, and
      a supporting recessed portion formed in said supporting link rod body and facing said base rod;
   when said link rod unit is in the folded position, said second synchronization end portions of said synchronization link rods are respectively received in said supporting recessed portions of said supporting link rods; and when said link rod unit is in the unfolded position, said second synchronization end portions of said synchronization link rods are disposed outside said supporting recessed portions.

7. The multi-link hinge assembly as claimed in claim 1, wherein:
each of said synchronization link rods further has
a synchronization link rod body interconnecting said first synchronization end portion and said second synchronization end portion, and
a synchronization recessed portion formed in said synchronization rod body;
when said link rod unit is in the folded position, said inner portions of said first supporting plates are respectively received in said synchronization recessed portions of said synchronization link rods; and
when said link rod unit is in the unfolded position, said synchronization recessed portions of said synchronization link rods face each other, and said inner portions of said first supporting plates are disposed outside said synchronization recessed portions of said synchronization link rods.

8. The multi-link hinge assembly as claimed in claim 1, wherein:
each of said first supporting rods further includes a second connecting end portion opposite to said first connecting end portion;
said link rod unit further includes
two connecting linkages pivotably and respectively connected to said first linking portions of said supporting link rods, and
two second supporting rods respectively and pivotably connected to said connecting linkages, and respectively and pivotably connected to said second connecting end portions of said first supporting rods; and said supporting plate unit further includes two second supporting plates respectively connected to said second supporting rods, and respectively abutting against said second connecting end portions of said first supporting rods.

9. The multi-link hinge assembly as claimed in claim 8, wherein:
each of said second supporting rods includes
a supporting end portion connected to the respective one of said second supporting plates,
a rotary end portion opposite to said supporting connection portion, and
a supporting connection portion disposed between said supporting end portion and said rotary end portion, and pivotably connected to said second connecting end portion of the respective one of said first supporting rods; and
each of said connecting linkages has
a first end connected pivotably to said first linking portion of the respective one of said supporting link rods, and
a second end opposite to said first end, and connected pivotably to said rotary end portion of the respective one of said second supporting rods.

10. The multi-link hinge assembly as claimed in claim 9, wherein:
each of the second supporting rods further includes a supporting rod body interconnecting said supporting connection portion and said rotary end portion, and having an inclined surface; and
when said link rod unit is in the folded position, a distance between said supporting connection portions of said second supporting rods is smaller than that between said rotary end portions of said second supporting rods, and said first supporting plates respectively abut against said inclined surfaces of said supporting rod bodies of said second supporting rods.

* * * * *